United States Patent
Wilmoth, III et al.

(10) Patent No.: US 9,834,280 B1
(45) Date of Patent: Dec. 5, 2017

(54) WATER FLOW DEFLECTION DEVICE AND METHODS OF USE

(71) Applicant: Robert Howard Wilmoth, III, Stafford, VA (US)

(72) Inventors: Robert Howard Wilmoth, III, Stafford, VA (US); Jonathan Brothers, Cary, NC (US)

(73) Assignee: Robert Howard Wilmoth, III, Stafford, VA (US)

(*) Notice: Subject to any disclaimer, the term of this patent is extended or adjusted under 35 U.S.C. 154(b) by 0 days.

(21) Appl. No.: 15/382,243

(22) Filed: Dec. 16, 2016

(51) Int. Cl.
*B63B 35/85* (2006.01)
*B63B 1/32* (2006.01)

(52) U.S. Cl.
CPC .............. *B63B 1/32* (2013.01); *B63B 35/85* (2013.01); *B63B 2035/855* (2013.01)

(58) Field of Classification Search
CPC ........................................................ B63B 1/32
See application file for complete search history.

(56) References Cited

U.S. PATENT DOCUMENTS

| | | | | |
|---|---|---|---|---|
| 2,914,019 A | * | 11/1959 | Gewin | B63H 25/50 114/145 A |
| 3,763,812 A | * | 10/1973 | Rowe | B63H 25/44 114/145 A |
| 4,577,580 A | * | 3/1986 | Diffely, Sr. | B63H 25/50 114/145 A |
| 9,296,447 B1 | * | 3/2016 | Morgan | B63B 1/28 |
| 2016/0009342 A1 | | 1/2016 | Thomas | |
| 2016/0059934 A1 | * | 3/2016 | Wilhelm | B63B 1/32 114/271 |

OTHER PUBLICATIONS

"QuickShift Wake Shaper." Retrieved from the internet: URL:http://www.quickshiftwakesurfing.com/429095804/product/2263205/quick-shift-wake-shaper?catid=796170 [retrieved on Jul. 27, 2016]; pp. 1-2.

* cited by examiner

*Primary Examiner* — Edwin Swinehart
(74) *Attorney, Agent, or Firm* — Coats & Bennett, PLLC

(57) ABSTRACT

A water flow deflection device configured to be attached to a side of a boat for boat wake enhancement is disclosed. The water flow deflection device includes a frame which includes a base, an extension arm, and two or more suction cups for attaching the water flow deflection device to the side of the boat. The water flow deflection device also includes a water flow deflector attached to the frame and includes an enlarged surface area aligned away from the extension arm and configured to deflect water. The deflector having two sections that are movable relative to each other such that the surface area is adjustable. The water flow deflection device also includes an adjustable support that extends between and connects the deflector to the extension, the support configured to adjust an angle of the deflector relative to the side of the boat.

19 Claims, 9 Drawing Sheets

WATER FLOW DEFLECTION DEVICE AND METHODS OF USE

TECHNICAL FIELD

The present application relates generally to an improved method and apparatus for water flow deflection and particularly to water flow deflection for the purposes of wake enhancement behind a boat.

BACKGROUND

The sport of wake surfing, performing surfing maneuvers on a surfboard in the wake of a boat without using a tow rope, has become popular among water sports and boating enthusiasts. Wake surfing is similar to surfing on natural ocean waves, except it is performed on the waves formed behind a moving boat. However, wake surfing is limited to boats capable of providing good surfable waves at a safe distance behind the boat. Wake surfing requires a large wake pattern to enable the rider to perform surfing maneuvers. New boats have been equipped with various systems to generate the surfable wake. However, the creation of sufficiently large, steep, surfable quality waves using older conventional ski boats is difficult and potentially dangerous for the wake surfer, the boat, and passengers.

Conventional water ski boats are not designed to make waves but, rather, to minimize them in order to minimize power requirements and to provide the smooth wake patterns that high speed skiing requires. Thus, the goal of conventional ski boat designs are to lessen displacement, decrease drag, and enable the boat to travel faster with less energy.

In order to generate an increase in wake size, wakeboarders have attempted to overcome the design objectives of conventional water ski boats by adding heavy, static ballast to the boat. Such ballast is usually in the form of water filled bags, concrete blocks, or other such weighted objects that disadvantageously occupy inboard passenger space. One other significant disadvantage to static ballast is that it can easily lead to an unsafe overload condition for the boat and passengers.

Ballasted boats for wakeboarding will not necessarily create wakes with surfable quality at normal speeds. Therefore, creating a surfable wave with a conventional ski boat typically involves a reduction in speed to less than 15 mph along with the addition of ballast to the boat. At such speeds and weights, the waves created by the boat are typically within a few feet of the boat's transom, as well as the exhaust and propeller. This makes wake surfing using conventional ski boats difficult to perform, unhealthy, and potentially dangerous.

SUMMARY

The present application is directed to a water flow deflection device configured to be attached to a side of a boat. The device is adjustable to be positioned on the boat, and adjustable to control the deflected water.

One embodiment is directed to a water flow deflection device that includes a frame with an elongated base with a first end and a second end with the base configured to be aligned along the side of the boat when the water flow deflection device is attached to the boat. The frame includes an extension arm attached to and extending outwardly from the base and having a first end and a second end. The extension arm extends away from the side of the boat when the water flow deflection device is attached to the boat. The frame also includes suction cups attached to the elongated base with a first suction cup attached to the elongated base proximate to the first end and a second suction cup attached to the elongated base proximate to the second end. The water flow deflection device also includes a water flow deflector attached to the extension arm and being aligned at an acute angle relative to the base. The deflector includes an enlarged surface area configured to deflect water with a leading end that is positioned outward in front of the base and a trailing end opposing the leading end. The leading end is in closer proximity to the boat than the trailing end when the deflector is attached to the boat. The deflector includes first and second sections that are movable relative to each other to adjust the distance between the leading end and the trailing end. The device also includes a support that extends between and connects the deflector to the extension arm. The support is configured to adjust the angle of the deflector relative to the extension arm.

The water flow deflection device may include a central section of the deflector between the leading and trailing ends attached to the first end of the extension arm.

The first and second sections of the deflector may be in an overlapping configuration with a first portion of the first section overlapping with a second portion of the second section.

The second section of the deflector may be positioned within the first section and may be extendable from within the first section.

The base may include first and second elongated members that are arranged in a side-by-side arrangement with the first member being parallel to the second member and the extension arm may be connected to at least one of the elongated members.

The water flow deflection device may be buoyant causing the water flow deflection device to float in water when detached from the boat.

The frame may include a third extension arm and may have a first end attached to the base and an opposing second end with a third suction cup. The third extension arm may be angularly adjustable relative to the base to position the third suction cup at a desired location relative to the base.

The second end of the base may be connected to the second end of the extension arm.

Another embodiment is directed to a water flow deflection device and includes a frame with an elongated base, an extension arm with a second end attached to the base and a first end positioned away from the base, and suction cups movably connected to the base. The device also includes a water flow deflector attached to the first end of the extension arm. The deflector includes a surface having a length and a width and having a leading end that is positioned in front of the second end of the base and an opposing trailing end positioned over the base. The deflector includes first and second sections that are in an overlapping arrangement and movable relative to each other to adjust a length of the deflector and an exposed surface area formed by exposed portions of the first and second sections. The device also includes an adjustable support that extends between and connects the deflector to the extension. The support is configured to adjust the angle of the deflector relative to the base.

The deflector may be adjustable over a range of acute angles relative to the base.

The first section of the water flow deflector may be fixedly connected to the extension arm and the second section is movable relative to the first section.

The first section of the water flow deflector may include a pocket formed between front and back sections with the pocket being sized to receive a portion of the second section of the water flow deflector.

The water flow deflection device may be buoyant.

The water flow deflection device may include a third extension arm that is movably connected to the base between the first and second ends and may include a third one of the suction cups.

Another embodiment is directed to a method of using a water flow deflection device to deflect water away from a side of a boat. The method includes: attaching suction cups of a water flow deflection device to the side of the boat and attaching the water flow deflection device to the boat with a water flow deflector aligned at an acute angle relative to the side of the boat; adjusting an exposed surface area of the water flow deflector by moving a first section of the water flow deflector relative to a second section and adjusting a size of the exposed surface area by changing an amount of overlap between the first and second sections; fixing the size of the exposed surface area by fixedly positioning the first section relative to the second section; and adjusting an angle of the water flow deflector relative to the side of the boat.

The method may also include adjusting the exposed surface area of the water flow deflector prior to attaching the water flow deflection device to the boat.

The method may include adjusting the angle of the water flow deflector relative to a base member prior to attaching the water flow deflection device to the boat.

The method may include adjusting a distance between the suction cups that are affixed to an elongated base such that the distance is equal to the distance between selected portions of the side of the boat.

The method may include that adjusting the first and second sections of the water flow deflector may include sliding the second section relative to the first section with the first and second sections being in an overlapping configuration.

The various aspects of the various embodiments may be used alone or in any combination, as is desired. Of course, the present disclosure is not limited to the above features and advantages. Indeed, those skilled in the art will recognize additional features and advantages upon reading the following detailed description, and upon viewing the accompanying drawings.

DETAILED DESCRIPTION

The present application is directed to a water flow deflection device configured to be attached to a side of a boat for boat wake enhancement. The device is attached to a side of the boat and diverts water as the boat is moving forward. A deflector on the device can be adjusted to the desired size and desired angular position relative to the boat to adjust the created wave as needed.

Figure 1:
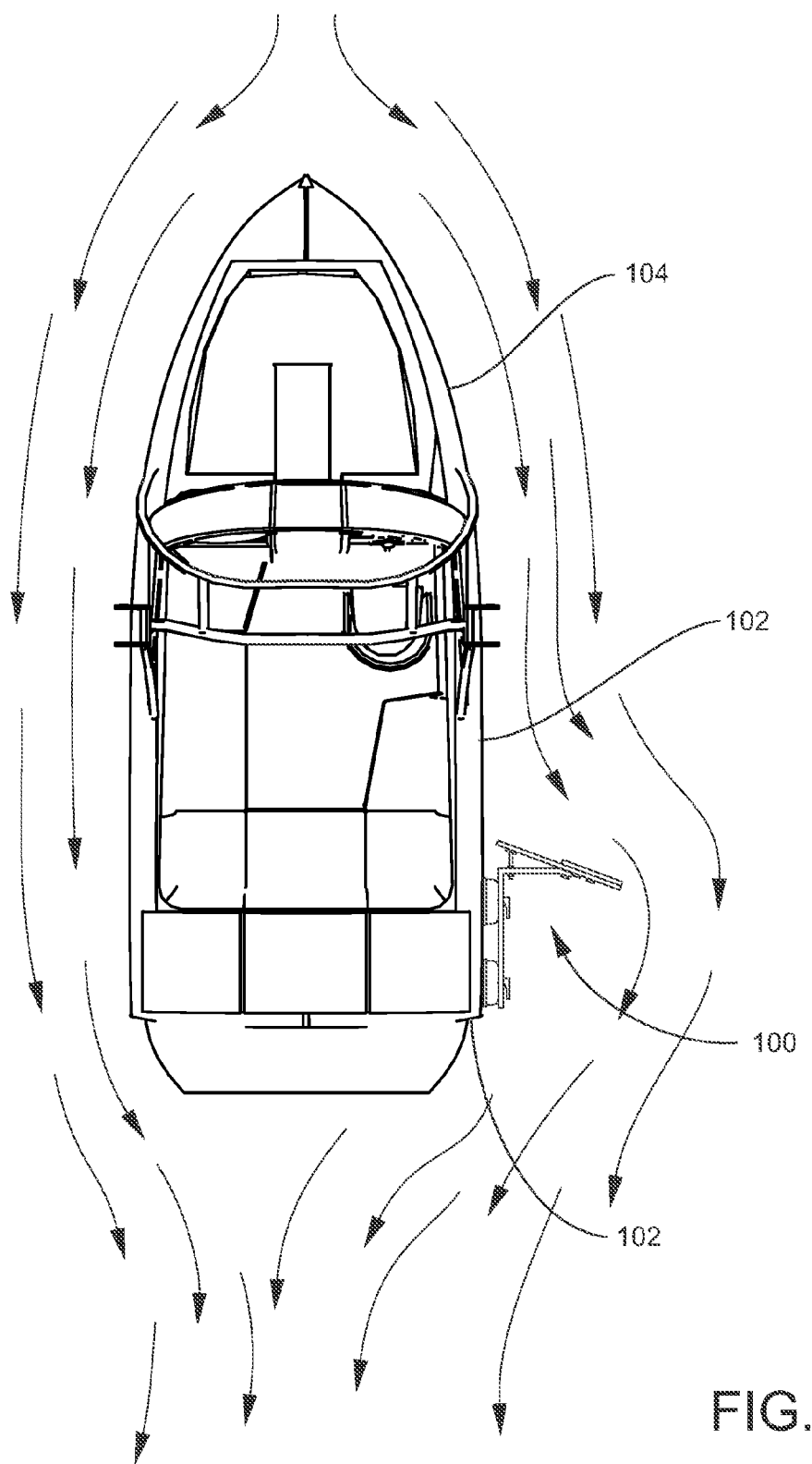
FIG. 1 illustrates a water flow deflection device attached to a side of a boat.

FIG. 1 illustrates a water flow deflection device 100 attached to a side 102 of a boat 104. As the boat 104 moves through the water, the water flow deflection device 100 redirects the flow of water outward and away from the side 102 of the boat 104. However, a vacuum is created in the water as the boat 104 moves forward. This vacuum draws the redirected flow of water back behind the boat 104 colliding with the flow of water from the opposing side of the boat 104. By redirecting the water away from the boat 104, the angle at which this redirected flow of water is drawn back behind the boat is altered. The redirected flow of water pushes up or enhances the flow of water from the opposing side of the boat 104 when the two flows merge back together behind the boat 104.

Figure 2A:
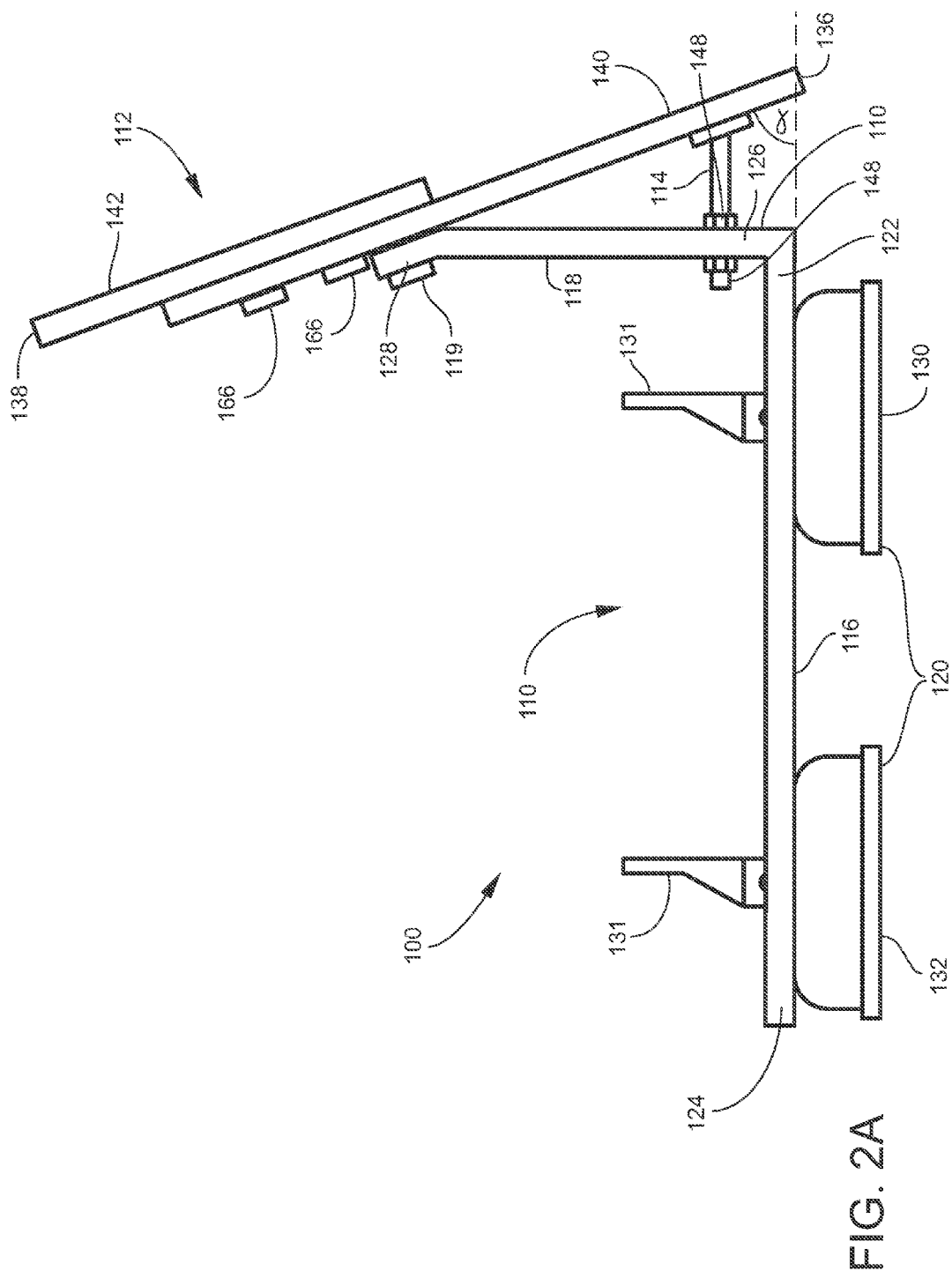
FIG. 2A illustrates a side view of a water flow deflection device to be attached to the side of the boat.
Figure 2B:
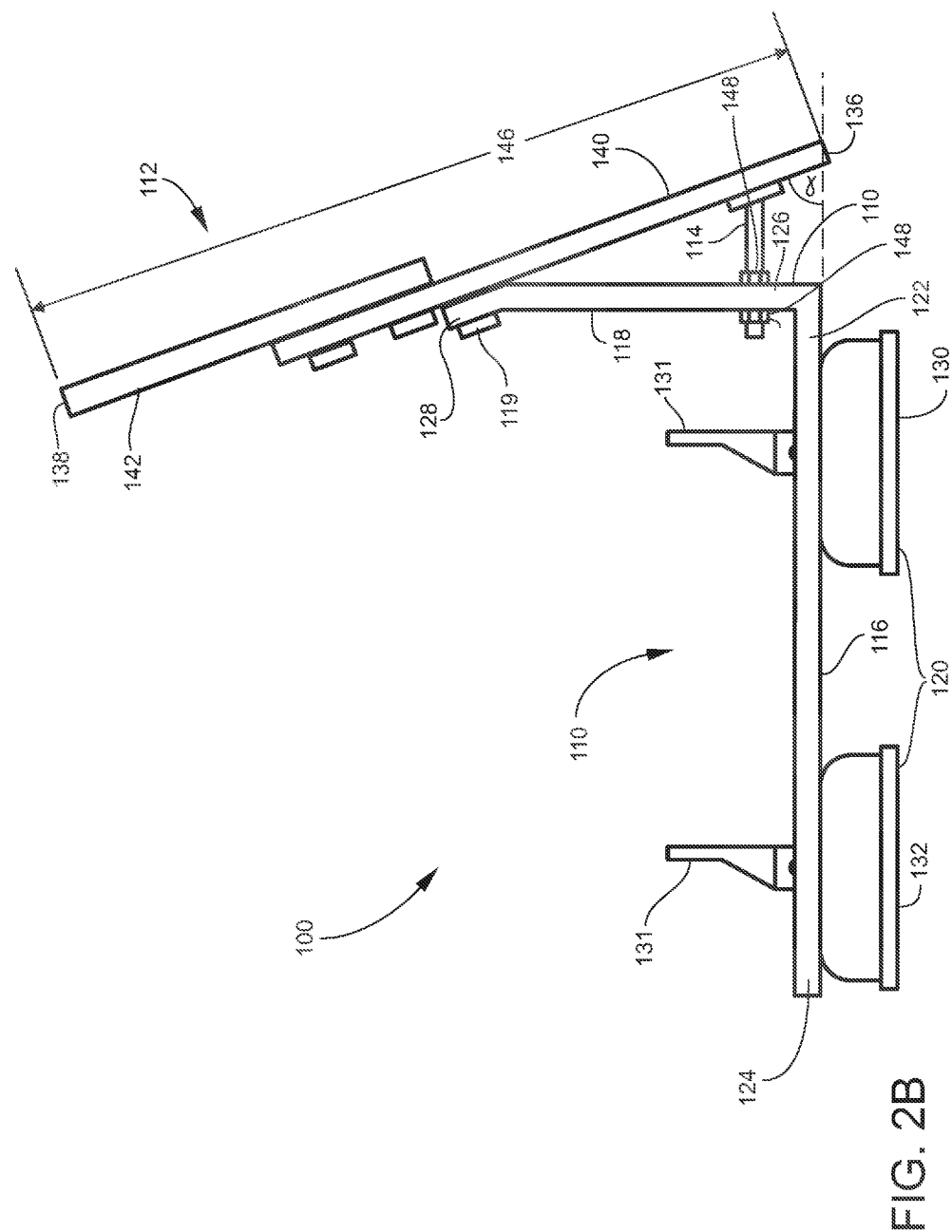
FIG. 2B illustrates a side view of the water flow deflection device of FIG. 2A in another configuration.

FIGS. 2A and 2B illustrate an embodiment of a water flow deflection device 100. The water flow deflection device 100 includes a frame 110, a water flow deflector 112, and an adjustable support 114.

The frame 110 includes an elongated base 116, an extension arm 118, and two or more suction cups 120. The elongated base 116 includes a first end 122 and a second end 124. The extension arm 118 has a first end 126 and a second end 128. The base 116 extends along the boat and the extension arm 118 extends away from the boat 104 when the water flow deflection device 100 is attached to the boat 104. The base 116 and arm 118 may be formed from a single integral piece as illustrated in FIGS. 2A and 2B, or may be constructed from two or more different pieces. In multiple-piece embodiments, the first ends 122, 126 may be in contact or spaced away from each other. In multiple-piece embodiments, the extension arm 118 may be attached to the base 116 in various manners including but not limited to welding, friction fit, and mechanical fasteners.

The extension arm 118 extends away from the base 116. While the angle that the extension arm 118 extends away from the base 116 is illustrated as approximately 90 degrees, the extension arm 118 may also be positioned at different angular orientations relative to the base 116. A top portion of the extension arm 118 in proximity to the second end 128 may be bent at an angle relative to a remainder of the arm 118. This configuration provides a surface for supporting the deflector 112 as will be explained below.

The extension arm 118 and base 116 may be constructed from a variety of different material, including but not limited to High-density polyethylene (HDPE) and Low-density polyethylene (LDPE). The base 116 and arm 118 may be constructed from the same or different materials. In one embodiment, the arms 116, 118 are constructed from a buoyant material that causes the water flow deflector device 100 to float when in the water and detached from the boat 104.

One or more suction cups 120 are attached to the base 116 to attach the device 10 to the boat 104. Any number of suction cups may be used, with the various Figures including embodiments with two suction cups 120. A first suction cup 130 is attached to the base 116 proximate to the first end 122, and a second suction cup 132 is attached to the base 116 proximate to the second end 124. The suction cups 120 may be attached to the elongated base 116 in a variety of different manners. For example, the suction cups 120 may be attached using a mechanical fastener such as a screw or bolt, may fit within slots/rails formed along the base 116, or may be integrally formed with the base 116. The suction cups 120 may be equipped with a release 131 to selectively secure and remove the suction cups 120 from the side 102 of the boat 104. The suction cups 120 may have various sizes. In some embodiments, the suction cups 120 have a diameter of between 1 and 6 inches to have sufficient suction to hold the water flow deflection device 100 against the side 102 of the boat 104 while the boat is moving through the water.

The water flow deflector 112 is attached to the extension arm 118. The deflector 112 may be attached at the second end 128 of the arm 118 as illustrated in FIGS. 2A and 2B. The deflector 112 may contact against and be supported by the angled section of the extension arm 118 at the second end 128. Each of the angled section and the rear of the deflector 112 may be flat to provide adequate contact and support. Alternatively, the deflector 112 is attached along an intermediate portion of the arm 118 between the ends 126, 128. The deflector 112 may be attached in a variety of different manners, including but not limited to one or more mechanical fasteners and welding.

The deflector 112 includes an enlarged surface area that faces away from the extension arm 118 and is configured to deflect water. The surface area may include a rectangular shape, although other shapes may also be used with each including a length and a width. The deflector 112 includes a leading end 136 and a trailing end 138 opposing the leading end 136. As illustrated in FIGS. 2A and 2B, the leading end 136 is positioned in front of the end 122 of the base 116. The trailing end 138 is positioned over the base 116. When mounted, the leading end 136 is proximate to the side 102 of the boat 104 and the trailing end 138 is positioned away from the side 102 of the boat 104. The leading end 136 may be aligned with the base 116, or may be positioned farther from or closer to the boat 104 during attachment (e.g., FIGS. 2A and 2B include the leading end 136 positioned closer to the boat 104 than the base 116).

As illustrated in both FIGS. 2A and 2B, the deflector 112 includes a first section 140 and a second section 142. The sections 140, 142 are in an overlapping configuration. In the illustrated embodiment, the second section 142 is positioned over the first section 140. Other embodiments may include the second section 142 behind the first section 140.

Figure 4:
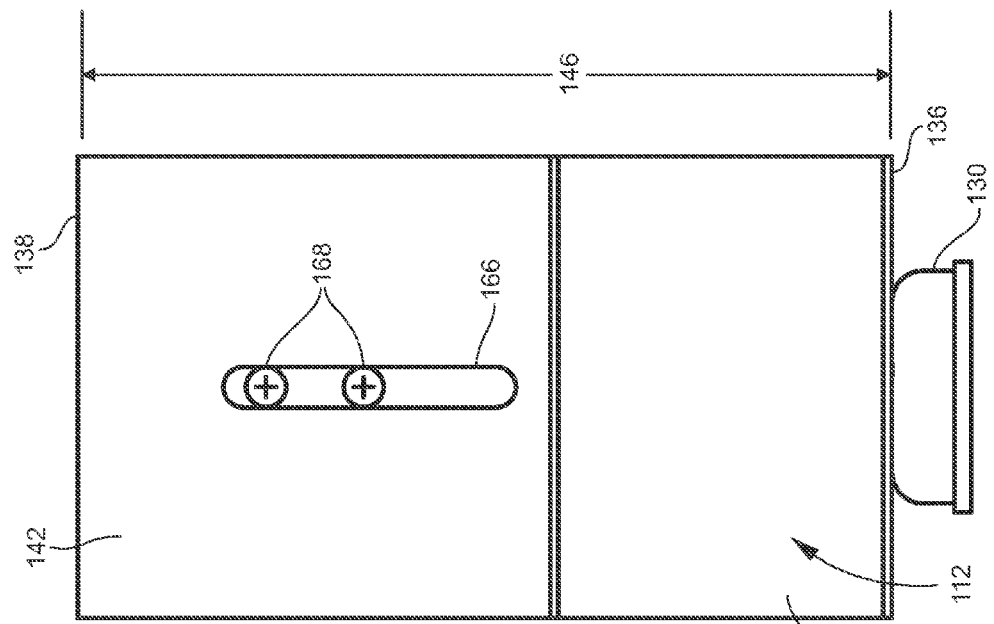
FIG. 4 illustrates a front view of the water flow deflection device of FIG. 3.
Figure 3:
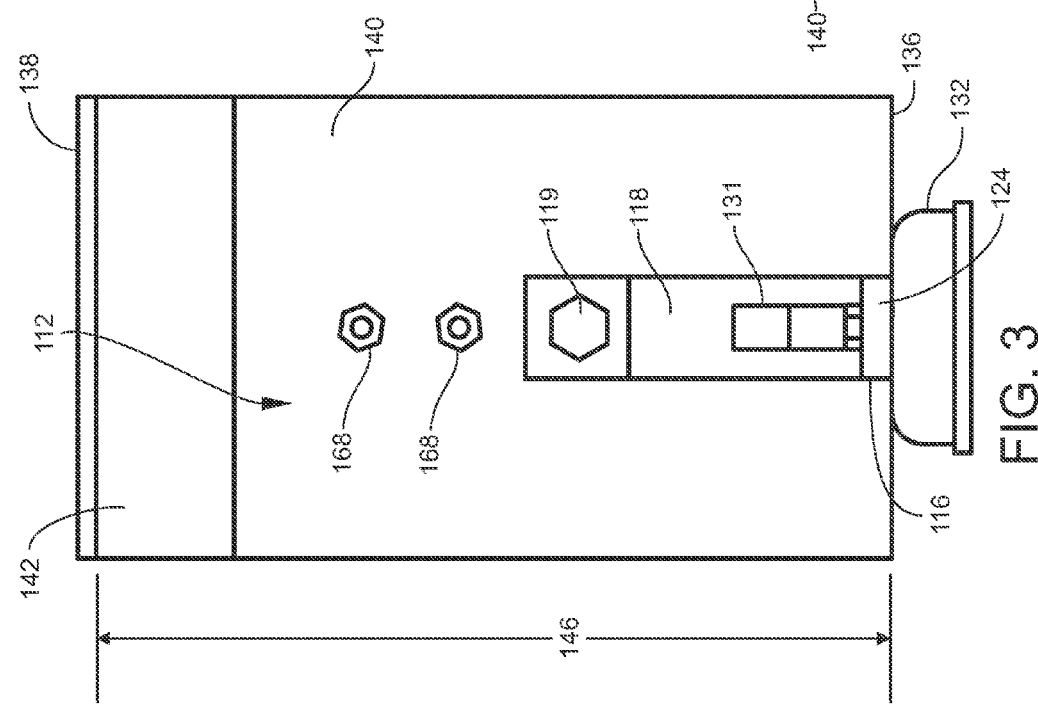
FIG. 3 illustrates a rear view of a water flow deflection device.

In one embodiment, the one or more fasteners 119 fixedly attach one of the sections 140, 142 to the extension arm 118. This may include attachment to the back section, such as section 140 as illustrated in FIGS. 2A, 2B, and 3. The front section of the deflector 112 (e.g., section 142 in these Figures) is then movably attached to the back section of the deflector 112. In one embodiment, one or both sections 140, 142 includes a slot 166 that extends along its length. One or more fasteners 168 are positioned in the slot(s) 166 and provide for movable placement of one section relative to the other section 140, 142. In the embodiment of FIGS. 3 and 4, just the front section 142 includes a slot 166 with the fasteners 168 connected to the back section 140 and extending through the slot 166. By loosening the fasteners 168, the second section 142 may be slid relative to the first section 140 to adjust a size of the surface area that is exposed. Once positioned, the fasteners 168 are tightened to secure the relative positions of the sections 140, 142. Rails, grooves, or other structures may be positioned on one or both sections 140, 142 to further facilitate the relative motion and to maintain the relative orientation of the sections 140, 142.

The back section of the deflector 112 (i.e., section 140 in FIGS. 3 and 4) may be fixedly attached to the extension arm 118. This provides for the movable front section of the deflector 112 (i.e., section 142 in FIGS. 3 and 4) to be in front of and supported by the back section. This provides additional support for the front section when the device 100 is in use and be acted upon by the water. The force of the water acting on the front section maintains its position against the back section. Alternatively, the front section of the deflector 112 may be attached to the extension arm 118.

The size of the deflector 112 is adjustable based on the relative positioning of the sections 140, 142. The overall size of the deflector 112 is formed by the amount of exposed area of each of the sections 140, 142. The deflector 112 will have a larger surface area when the sections 140, 142 have less overlap and are slid apart. Likewise, the deflector 112 will have a smaller surface area when the sections 140, 142 have a greater amount of overlap. In one embodiment, the sections 140, 142 are adjustable along one dimension. In FIGS. 3 and 4, the sections 140, 142 are movable in one dimension to adjust length 146 measured between the leading end 136 and the trailing end 138. In the embodiment of FIGS. 3 and 4, the second section 142 may be repositioned relative to the first section 140 by sliding the second section 142 over the first section 140 and adjusting the length 146. As the length 146 measured between the leading end 136 and the trailing end 138 is increased, the size of the enlarged surface area 134 increases. In a similar fashion, the second section 142 may be slid back over the first section 140 so as to decrease the length 146 and the surface area 134. The deflector 112 may have various sizes depending upon the need. In some embodiments, the surface area is adjustable between 40 to 140 square inches.

The deflector 112 may also be configured to provide for adjustment along two dimensions, such as to adjust a length and a width.

Figure 5:
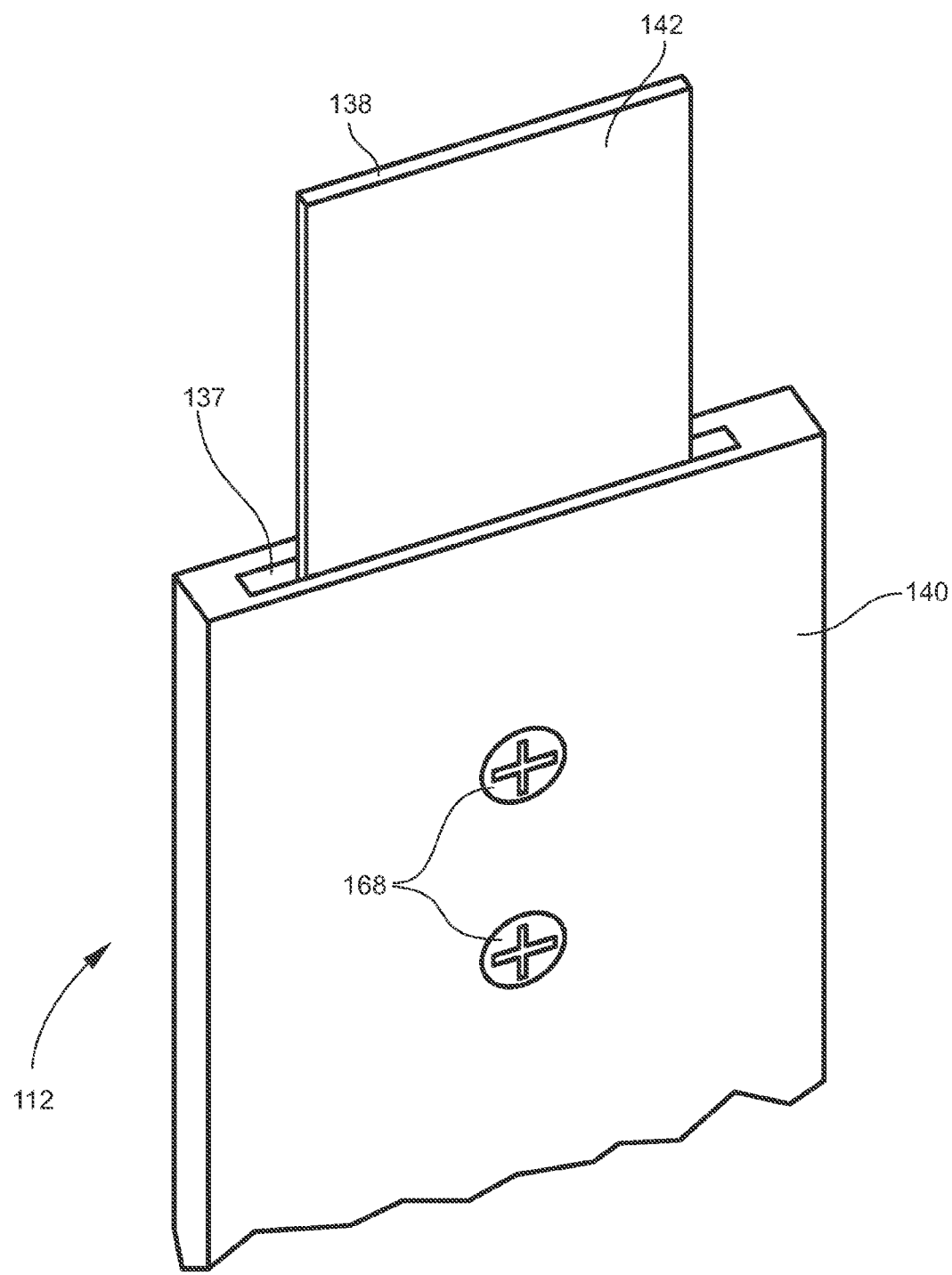
FIG. 5 is a partial perspective view of a deflector.

As illustrated in FIG. 5, the deflector 112 may also include the second section 142 positioned within a pocket 137 formed in the interior of the first section 140. The second section 142 may be adjusted to the desired positioned relative to the first section 140 and secured in position by one or more fasteners 168. In the embodiment of FIG. 5, the second section 142 includes a slot (not illustrated) sized to receive the fasteners 168 and provide for the selective positioning.

The sections 140, 142 may include the same shapes and sizes. For example, the embodiment of FIGS. 3 and 4 includes the sections 140, 42 having a common width. FIG. 5 includes the second section 142 having a smaller width than the first section 140.

The angle α of the deflector 112 relative to the base 116 is adjustable. As illustrated in FIGS. 2A and 2B, a support 114 extends between and connects the deflector 112 to the extension 118. As illustrated, the angle α is formed between an extension of the base 116 and the deflector 112.

The support 114 is connected to the same section of the deflector as the extension arm 118. In one embodiment as illustrated in FIGS. 2A and 2B, this includes connection to the first section 140. This allows for the front section 142 to be movable to adjust the overall size of the deflector 112. The deflector 112 is attached to the extension arm 118 to allow for adjusting the angle α. In one embodiment, this may include the mechanical fastener 119 loosely connecting the extension arm 118 to the deflector 112 thus allow for movement. This may also include the extension arm 118 being flexible to allow for changing the angle α.

The support 114 may be a threaded member such as a bolt with one or more adjustable securing members 148. The securing members 148 may be configured to allow a user to hand tighten or loosen the member 148 to adjust the angle α. In one embodiment, the securing members 148 may be wing nuts, knobs, or bolts. The securing member 148 may be configured so as to be affixed on one or both sides of the extension arm 118. For example, in some embodiments only one securing member 148 may be required in order to provide for adjustment, while other embodiments as illustrated in FIGS. 2A and 2B include a securing member 148 on each side of the extension arm 118.

The water flow deflection device 100 may be configured such that it is buoyant, causing the water flow deflection device 100 to float in water when detached from the boat 104. The buoyancy may be a result of one or more sections of the frame 110 being hollow. The water flow deflection device 100 may also be configured with a leash that is attachable to the boat 104.

Figure 6:
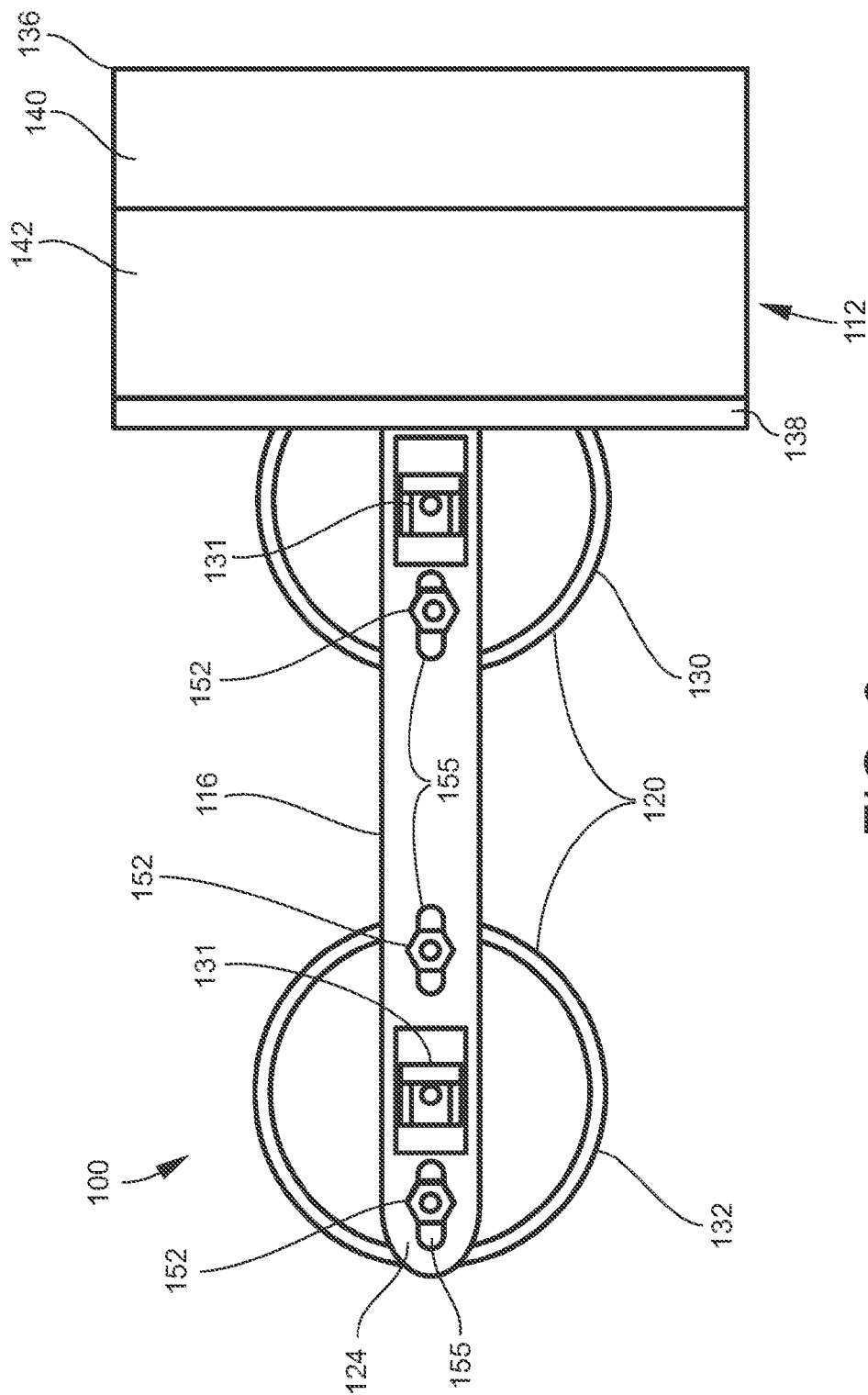
FIG. 6 illustrates a top view of a water flow deflection device.

FIG. 6 is a top view of the water flow deflection device 100. In this embodiment, the suction cups 120 are attached to the base 116 by attachment members 152. The positioning of the suction cups 120 along the base 116 may be adjusted by loosening the attachment members 152, sliding the suction cups 120 along the adjusting slots 155 formed in the base 116, and securing the attachment members 152. By adjusting the position of the suction cups 120 on the base 116, the suctions cups 120 can be aligned with the desired sections of the boat 102 to provide for a secure attachment. The length of the elongated base 116 and the length of the adjusting slots 155 may vary as desired to provide the necessary adjustment for positioning the suction cups 120 over a substantially smooth portion of the side 102 of the boat 104. For example, the length of the elongated base 116 may be up to 4 feet. The adjusting slots 155 may be variably sized so as to accommodate the release 131.

Figure 7:
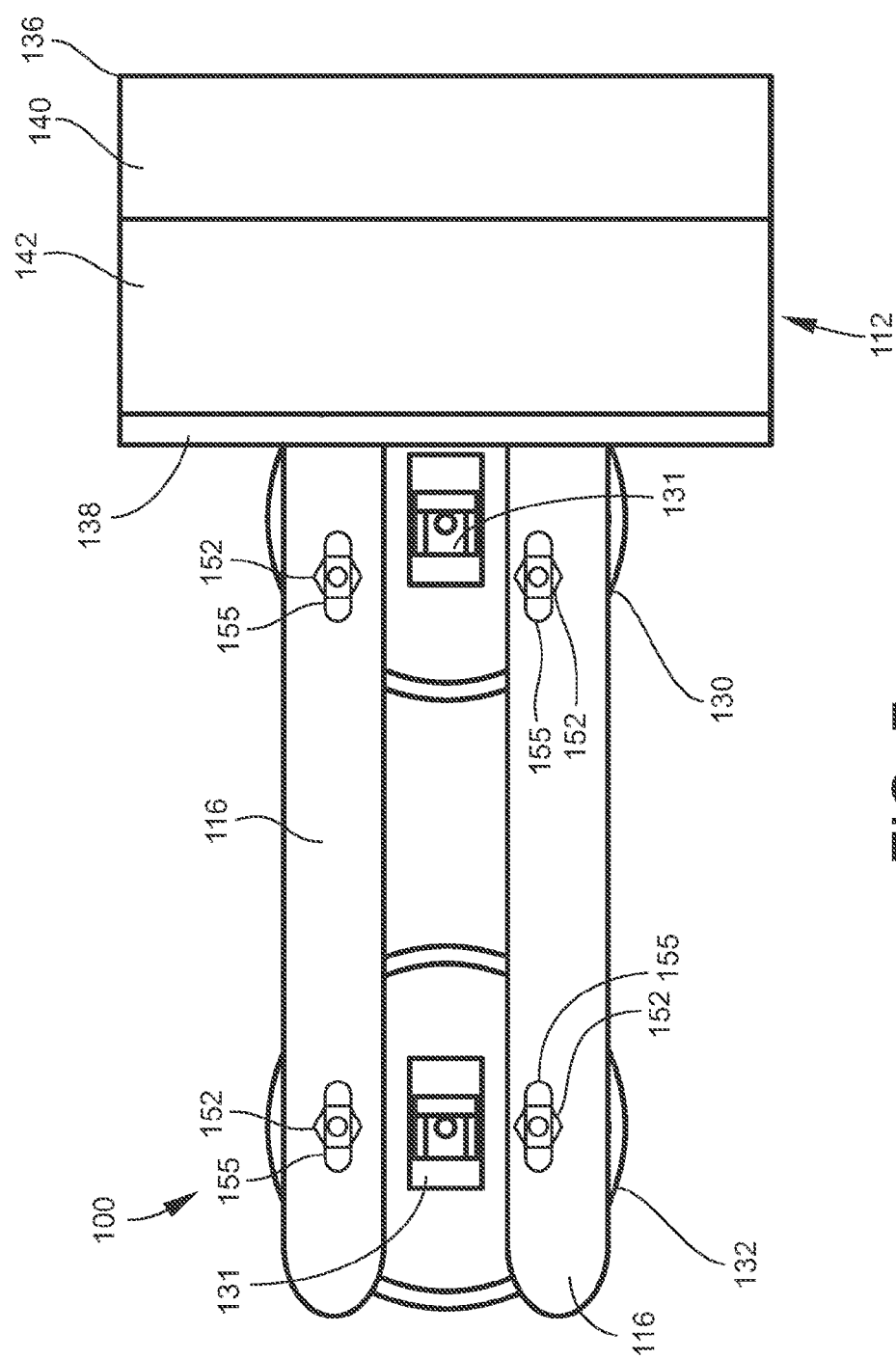
FIG. 7 illustrates a top view of a water flow deflection device.

In an alternative configuration as illustrated in FIG. 7, the base 116 is formed by two separate members. The members are each straight and aligned in a side-by-side and parallel orientation. Suctions cups 130, 132 are movably attached to the members via elongated slots 155 equipped with fasteners 152. In this embodiment, the extension arm 118 (not illustrated in FIG. 7) may be formed by two separate members in a side-by-side and parallel orientation. In one embodiment, the frame 110 is constructed from two separate members that each includes a base 116 and extension arm 118. Each member may have the same appearance as that illustrated in FIGS. 2A and 2B.

Figure 8:
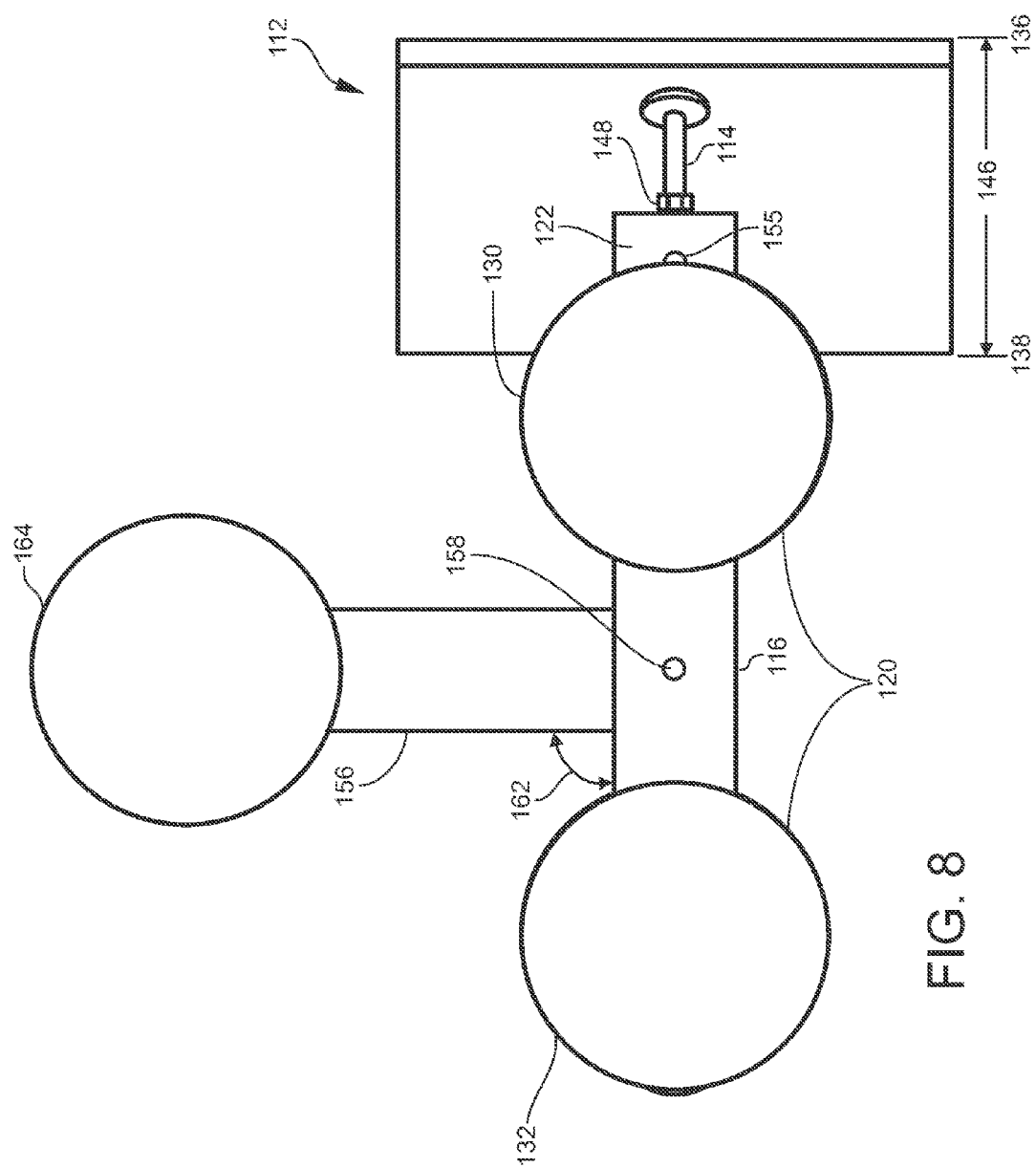
FIG. 8 illustrates a bottom view of a water flow deflection device.

FIG. 8 illustrates an embodiment that includes an arm 156 connected to the base 116. The arm 156 is attached along an intermediate section of the base 116 between the suction cups 130, 132. The arm 156 is attached in a manner to be positioned at a desired angle 62 relative to the base 116. In one embodiment, the end of the arm 156 is connected with a mechanical fastener 158 to the base 116. This provides for pivoting movement of the arm about the fastener 158 to the desired angular position. The fastener 158 may be tightened when the arm 156 is at the desired orientation to lock the position. A suction cup 164 is attached to the arm 156 proximate to extended end.

Figure 9:
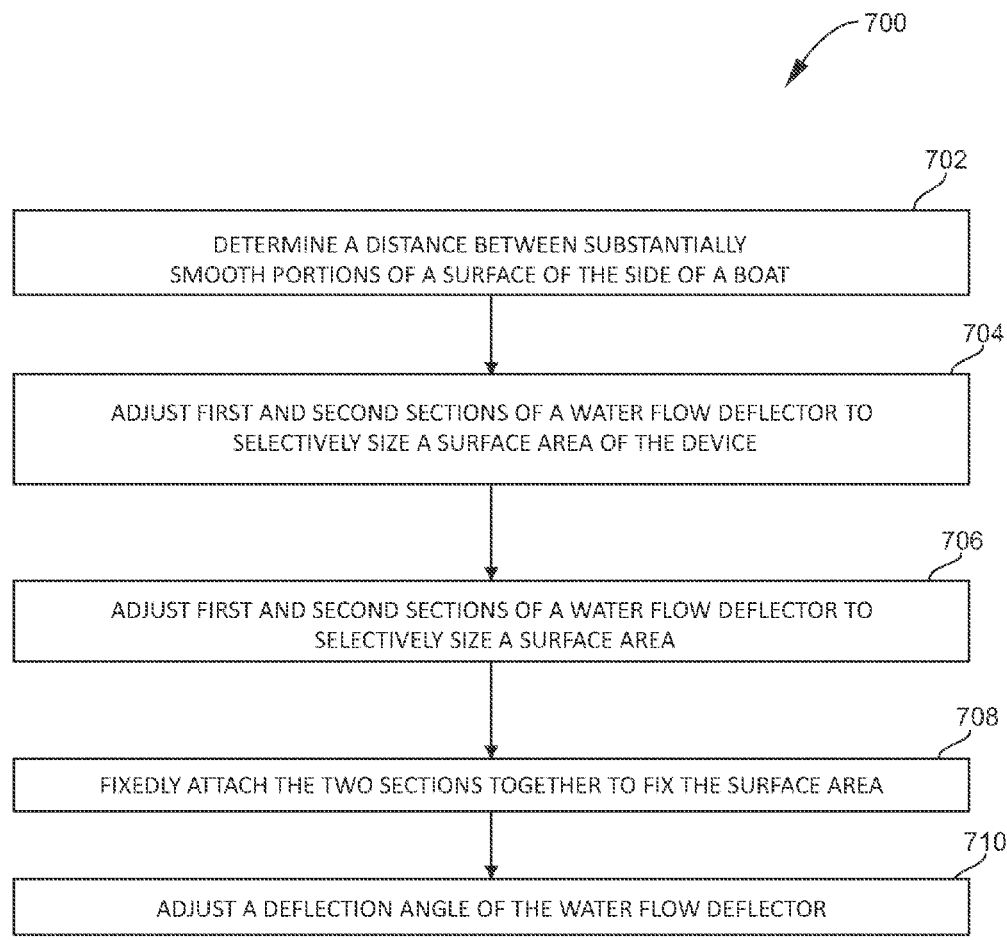
FIG. 9 illustrates a flow chart of a method of use of the water flow deflection device.

A method 700 of use of the water flow deflection device 100 is illustrated in FIG. 9. The method 700 includes determining a distance between substantially smooth portions of a surface of the side of a boat (block 702). A substantially smooth portion of the surface of the side of the boat may be a surface that does not have decals or dimensioned labelling. The method also includes adjusting the distance between two or more suction cups affixed to the base of the water flow deflection device (block 704). The suction cups are adjusted such that the distance between the suction cups is equal to the distance between the substantially smooth portions of the side of the boat. The method also includes adjusting first and second sections of a water flow deflector to selectively size a surface area (block 706). The deflector is operatively connected to the suction cups and includes a leading end and the opposing trailing end. The leading end is proximate to the side of the boat and the trailing end extending away from the side of the boat when the device is attached to the side of the boat. Adjusting the first and second sections changes a distance between the leading end and the trailing end. The method also includes fixedly attaching the two sections together to fix the surface area (block 708). The method also includes adjusting a deflection angle of the water flow deflector (block 710).

Some of the adjustments may occur prior to attachment to the boat. Alternatively, some or all of the adjustments may occur after the device is attached to the boat.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A water flow deflection device configured to be attached to a side of a boat for the enhancement of a boat wake, the water flow deflection device comprising:
   a frame comprising:
      an elongated base with a first end and a second end, the base configured to be aligned along the side of the boat when the water flow deflection device is attached to the boat;
      an extension arm attached to and extending outwardly from the base, the extension arm having a first end and a second end, the extension arm extending away from the side of the boat when the water flow deflection device is attached to the boat; and
      suction cups attached to the elongated base, a first one of the suction cups being attached to the elongated base proximate to the first end and a second one of the suction cups attached to the elongated base proximate to the second end;
   a water flow deflector attached to the extension arm and being aligned at an acute angle relative to the base, the deflector comprising an enlarged surface area configured to deflect water and having a leading end that is positioned outward in front of the base and a trailing end opposing the leading end, the leading end being in closer proximity to the boat than the trailing end when the deflector is attached to the boat, the deflector comprising first and second sections that are movable relative to each other adjust the distance between the leading end and the trailing end and the surface area that is exposed are adjustable; and a support that extends between and connects the deflector to the extension arm, the support configured to adjust the angle of the deflector relative to the extension arm.

2. The water flow deflection device of claim 1, wherein a central section of the deflector is attached to the first end of the extension arm.

3. The water flow deflection device of claim 1, wherein the first and second sections of the deflector are in an overlapping configuration with a first portion of the first section overlapping with a second portion of the second section.

4. The water flow deflection device of claim 1, wherein the second section of the deflector is positioned within the first section and is extendable from within the first section.

5. The water flow deflection device of claim 1, wherein the base comprises first and second elongated members that are arranged in a side-by-side arrangement with the first member being parallel to the second member, the extension arm being connected to at least one of the elongated members.

6. The water flow deflection device of claim 1, wherein the water flow deflection device is buoyant causing the water flow deflection device to float in water when detached from the boat.

7. The water flow deflection device of claim 1, wherein the frame further comprises a second extension arm having a first end attached to the base and an opposing second end having a third one of the suction cups, the second extension arm being angularly adjustable relative to the base to position the third suction cup at a desired location relative to the base.

8. The water flow deflection device of claim 1, wherein the second end of the base is connected to the second end of the extension arm.

9. A water flow deflection device configured to be attached to a side of a boat for the enhancement of a boat wake, the water flow deflection device comprising:
   a frame comprising:
      an elongated base;
      an extension arm with a second end attached to the base and a first end positioned away from the base; and
      suction cups movably connected to the base;
   a water flow deflector attached to the first end of the extension arm and comprising a surface having a length and a width, the water flow deflector including a leading end that is positioned in front of the base and an opposing trailing end positioned over the base, the deflector comprising first and second sections that are in an overlapping arrangement and movable relative to each other to adjust a length of the deflector and an exposed surface area formed by exposed portions of the first and second sections; and
   an adjustable support that extends between and connects the deflector to the extension arm, the support configured to adjust the angle of the deflector relative to the base.

10. The water flow deflection device of claim 9, wherein the deflector is adjustable over a range of acute angles relative to the base.

11. The water flow deflection device of claim 9, wherein the first section of the water flow deflector is fixedly connected to the extension arm and the second section is movable relative to the first section, the first section being positioned behind the second section when the device is attached to the boat.

12. The water flow deflection device of claim 9, wherein the first section of the water flow deflector includes a pocket formed between front and back sections, the pocket sized to receive a portion of the second section of the water flow deflector.

13. The water flow deflection device of claim 9, wherein the water flow deflection device is buoyant.

14. The water flow deflection device of claim 9, further comprising a second extension arm that is movably connected to the base between the first and second ends and including a third one of the suction cups.

15. A method of using a water flow deflection device to deflect water away from a side of a boat, the method comprising:
   attaching suction cups of a water flow deflection device to the side of the boat and attaching the water flow deflection device to the boat with a water flow deflector aligned at an acute angle relative to the side of the boat;
   adjusting an exposed surface area of the water flow deflector by moving a first section of the water flow deflector relative to a second section and adjusting a size of the exposed surface area by changing an amount of overlap between the first and second sections;
   fixing the size of the exposed surface area by fixedly positioning the first section relative to the second section; and
   adjusting an angle of the water flow deflector relative to the side of the boat.

16. The method of claim 15, further comprising adjusting the exposed surface area of the water flow deflector prior to attaching the water flow deflection device to the boat.

17. The method of claim 15, further comprising adjusting the angle of the water flow deflector relative to a base member prior to attaching the water flow deflection device to the boat.

18. The method of claim 15, further comprising adjusting a distance between the suction cups that are affixed to an elongated base such that the distance is equal to the distance between selected portions of the side of the boat.

19. The method of claim 15, wherein adjusting the first and second sections of the water flow deflector comprises sliding the second section relative to the first section with the first and second sections being in an overlapping configuration.

* * * * *